United States Patent [19]

Kruka et al.

[11] Patent Number: 4,510,588

[45] Date of Patent: Apr. 9, 1985

[54] HYDROPHONE CABLE DECOUPLER

[75] Inventors: Vitold R. Kruka; Robert M. Kipp; Edward R. Cadena, all of Houston, Tex.

[73] Assignee: Shell Oil Company, Houston, Tex.

[21] Appl. No.: 333,526

[22] Filed: Dec. 22, 1981

[51] Int. Cl.³ .............................................. G01V 1/38
[52] U.S. Cl. .................................... 367/165; 367/154
[58] Field of Search .............. 367/152, 154, 157, 165, 367/166, 21, 15, 130, 901, 106; 339/47 R, 49 R; 181/286, 284

[56] References Cited

U.S. PATENT DOCUMENTS 3,434,104  3/1969  Stapleton et al. ................... 367/154
4,300,218  11/1981  Kruka et al. ........................ 367/165

Primary Examiner—Nelson Moskowitz
Assistant Examiner—Gregory Issing

[57] ABSTRACT

A marine seismic cable comprising a cable core, a housing adapted for holding an acoustic energy transducer, and a body of elastic material positioned between the cable core and the housing.

4 Claims, 2 Drawing Figures

HYDROPHONE CABLE DECOUPLER

BACKGROUND OF THE INVENTION

This invention relates generally to seismic exploration of substrata beneath bodies of water and, more particularly, to a marine seismic cable for sensing reflected seismic waves from such substrata.

Marine seismic exploration is often conducted by towing a seismic streamer at a given depth through the ocean or other body of water. The streamer is provided with a plurality of acoustic sensitive transducers disposed at appropriate intervals along the length thereof. Acoustic wave energy is provided in the vicinity of the cable by an air gun or other suitable means; this wave energy travels downwardly through the earth with a portion of it being reflected upwardly at levels where there is a contrast in the velocity propagation characteristics of the strata. The seismic transducers sense the acoustic waves produced in the water by the upwardly traveling seismic reflections and provide electrical signals indicative thereof to suitable processing and recording equipment located on the seismic vessel that is towing the streamer.

The magnitude of the reflected signals is extremely small, thus making it essential to minimize extraneous noise. One source of such noise is the longitudinal waves which are propagated along the tension member of the seismic cable by the unsteady movement of the seismic vessel as it heaves, pitches and rolls in an unsteady sea. This unsteady motion which is transmitted to the cable via its attachment to the vessel may also result in lateral, shear, Rayleigh and torsional waves depending on the structure of the cable. These various waves are detected by the seismic transducers, thereby reducing the signal to noise ratio of the seismic signals.

Therefore, it is an object of the present invention to provide a marine seismic cable in which the seismic transducers are isolated from the waves generated in the cable by the nonuniform movement of the seismic vessel that is towing the cable.

SUMMARY OF THE INVENTION

In accordance with the present invention there is provided a marine seismic cable comprising a cable core, a housing adapted for holding an acoustic energy transducer, and a body of elastic material positioned between the cable core and the housing.

The body of elastic material or cushion decouples the transducer housing from cable-borne noise, such as longitudinal waves, torsional waves, lateral waves and the like, occurring along the stress member of the cable core to reduce the noise sensed by the acoustic energy transducer. The cushion can be any flexible material, such as urethane having embedded glass or plastic microspheres or balloons, and, preferably, it occupies the entire space between the undersurface of the transducer housing and the cable core to form a solid body of insulating or cushioning material. However, the cushion may take other forms, and it may be separated from either the transducer housing, core or both by other materials. In the preferred embodiment, the cable core approximates a cylinder and the transducer housing is at least substantially curved, and preferably is cylindrical.

Obviously, if the thickness of the cushion is increased, the transducer housing is subjected to less of the extension and flexion of the cable core and hence less noise is transmitted to the acoustic energy transducer. However, in general, the size of the cable core and of the overall cable are constrained so that any increase in the thickness of the cushion requires a corresponding decrease in the thickness of the transducer housing. As the thickness of the transducer housing is decreased, the housing becomes less rigid and more susceptible to movement of the core even though the magnitude of this movement has been reduced by the cushion. The usual requirement that the transducer housing be as light as possible in order to maintain the proper buoyancy of the cable restricts the possibility of using a stronger material in the thinner housing. Accordingly, an optimum thickness of the cushion must be determined to provide maximum isolation of the acoustic energy transducer. This optimum thickness is determined by the following equations:

$$R_1 R_3^2 + R_1 R_2^2 - 2R_2^3 = 0$$

and $$T = R_2 - R_1$$

where $R_1$ is the radius of the core, $R_2$ and $R_3$ are the inside and outside radii, respectively, of the transducer housing and T is the thickness of the cushion.

Other objectives, advantages and applications of the present invention will be made apparent by the following detailed description of the preferred embodiments of the present invention.

DETAILED DESCRIPTION OF THE PREFERRED EMBODIMENTS

Figure 1:
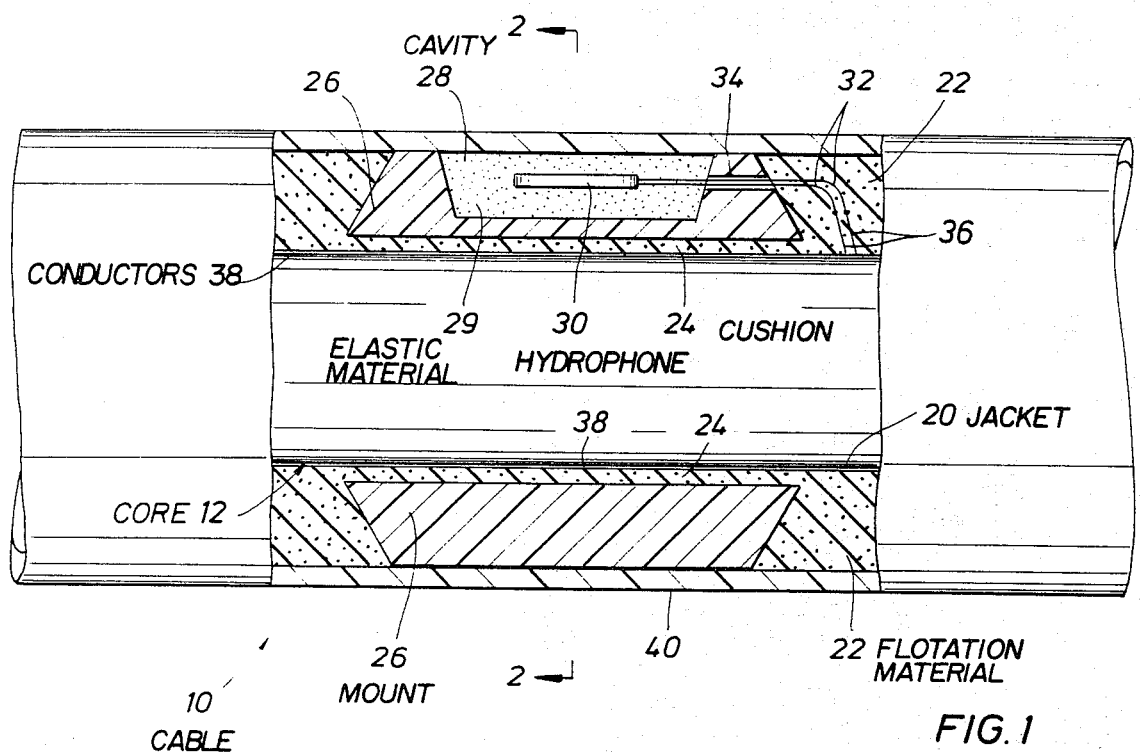
FIG. 1 is a sectional view in side elevation of a marine seismic cable in accordance with the present invention.
Figure 2:
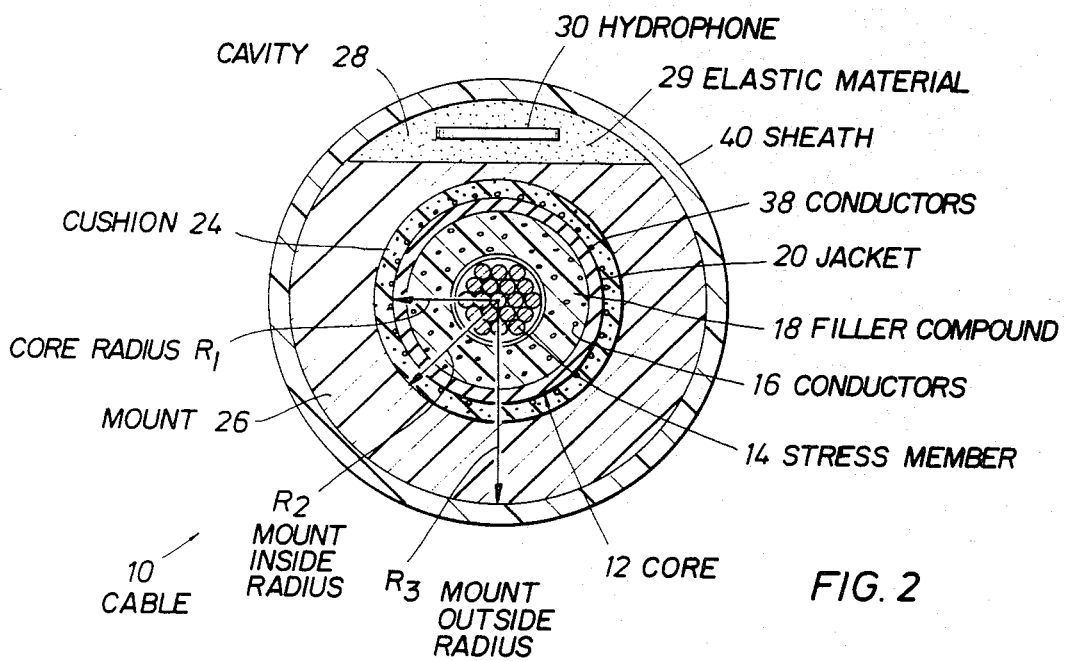
FIG. 2 is a cross section taken along line 2—2 of FIG. 1.

Referring to FIGS. 1 and 2, a section of a marine seismic cable in accordance with the present invention is indicated generally by numeral 10. Cable 10 has a core 12 which consists of a stress member 14, which can be a flexible steel cable or a synthetic fiber rope and a plurality of electrical conductors 16 disposed around stress member 14. The voids between conductors 16 are filled with a suitable filler compound 18, and a jacket 20 of urethane or other suitable material is extruded over the outer portion of conductors 16 and filler 18. Core 12 is disposed axially within a cylindrical body of flotation material 22, such as soft urethane having embedded glass or plastic microspheres or balloons, to provide the desired buoyancy. It should be noted that the foam-filled cable is served by way of example and not limitation, since the novel aspects of the present invention can be utilized in any cable having a central stress member or core.

At discrete locations along cable 10 a portion of flotation material 22 is removed leaving a cushion 24 which consists of a thin layer of flotation material 22 remaining around core 12. If desired, flotation material 22 may be totally removed, and another elastic material may be substituted therefor to form cushion 24. A cylindrical hydrophone mount 26 having an inside diameter that is substantially the same as the outside diameter of cushion 24 is positioned around cushion 24. Mount 26, which can be formed of rigid polyurethane with embedded hollow glass spheres, has a cavity 28 which is filled with a moldable elastic material 29 having acoustic properties similar to those of the marine environment, such as polysulfide elastomer. Hydrophone 30 is positioned in elastic material 29 such that it is displaced from the walls of cavity 28. Electrical leads 32 from hydrophone 30 are brought out through aperture 34 in the wall of mount 26 and are connected in a suitable manner to a pair of electrical conductors 36 from the set of electrical conductors 38 provided by the termination (not shown) of the cable section. A sheath 40 of, for example, polyurethane plastic, is extruded over flotation material 22 and mount 26 to provide a relatively smooth and damage resistant outer surface.

If the overall size of cable 10 is not limited, then cushion 24 is made as thick as practically possible. However, if the radius of core 12 and the outside radius of mount 26 are fixed, then the optimum thickness of cushion 24 must be determined to maximize the isolation of hydrophone 30 from the extension and flexion of core 12. It has been found that it can be assumed that when core 12 stretches, the displacement of the inner surface of cushion 24 is a linear function of distance from the midlength of mount 26, and the outside surface of cushion 24 is held nearly motionless by mount 26. As used herein, $R_1$ is the radius of core 12, $R_2$ and $R_3$ are the inside and outside radii, respectively, of mount 26, $z$ represents the axial direction along cable 10 and $r$ represents the radial direction along cable 10. Therefore, the axial displacement of cushion 24 can be expressed as follows:

$$U_z = \frac{az}{l} \frac{R_2 - r}{R_2 - R_1} \quad (1)$$

where $a$ is a constant and $l$ is some distance along the axis. Shear strain, $\epsilon_{rz}$, in cushion 24 is expressed as:

$$\epsilon_{rz} = \frac{1}{2}\left(\frac{\partial u_r}{\partial z} + \frac{\partial u_z}{\partial r}\right) = -\frac{1}{2}\frac{a}{l(R_2 - R_1)} z \quad (2)$$

The shear stress, $\tau_{rz}$, of cushion 24 is given by:

$$\tau_{rz} = 2 G \epsilon_{rz} = -G \frac{a}{l(R_2 - R_1)} z \quad (3)$$

where G is the shear modulus of the elastic material of cushion 24. A relationship between shear stress acting on the inside of mount 26 and axial stress, $\sigma_z$, can be derived by setting the sum of axial forces equal to zero as follows:

$$\frac{\partial \sigma_z}{\partial z} = \tau_{rz} \frac{2R_2}{R_3^2 - R_2^2} \quad (4)$$

or by relating axial stress to displacement, $u_z^*$, of mount 26 as follows:

$$\frac{\partial^2 u_z^*}{\partial z} = \tau_{rz} \frac{2}{E} \frac{R_2}{R_3^2 - R_2^2} \quad (5)$$

where E is the Young's modulus of mount 26. Equation (5) may be integrated after substitution from equation (3) for shearing stress to provide the relationship:

$$u_z^* = -\frac{Ga}{3El} \frac{R_2}{(R_3^2 - R_2^2)(R_2 - R_1)} + A_o z + A_1 \quad (6)$$

where $A_o$ and $A_1$ are constants. Since strain, $\epsilon_m$, in mount 26 is given by:

$$\epsilon_m = \partial u_z^*/\partial z \quad (7)$$

and with the boundary condition of a free end at z equal to l the strain in mount 26 can be expressed as follows:

$$\epsilon_m = \frac{Ga}{E} \frac{R_2}{(R_3^2 - R_2^2)(R_2 - R_1)} \left(-\frac{z^2}{l} + l\right) \quad (8)$$

$R_2$ is chosen to minimize $\epsilon_m$ at z equal to zero with a given core stretch displacement of a. Therefore, taking the partial derivative of equation (8) with respect to the changing variable, that is, $R_2$, the desired relationship between $R_1$, $R_2$ and $R_3$ is obtained as follows:

$$R_1 R_3^2 + R_1 R_2^2 - 2R_2^3 = 0 \quad (9)$$

Accordingly, the thickness, T, of cushion 24 can be determined by the expression:

$$T = R_2 - R_1 \quad (10)$$

The relationships expressed in equations (9) and (10) provide the optimum thickness of cushion 24 for decoupling hydrophone 30 from the cable-borne noise of core 12.

Preferably, mount 26 is a split mount having two interlocking halves which are held together by two pins which are inserted through aligned apertures in the interlocking halves, as described in our copending U.S. patent application, Ser. No. 06/333,527, which was filed on the same day as the instant application and is assigned to a common assignee. However, other types of mounts may be utilized with the present invention for example, the saddle mount disclosed in U.S. Pat. No. 3,781,778. In addition, cable 10 may include a rigid shield attached to mount 26, as disclosed in our copending U.S. patent application, Ser. No. 06/333,525, or a waveguide shield, as described in the copending U.S. patent application of Kruka and Cadena, Ser. No. 06/333,524, both of which were filed on the same day as the instant application and are assigned to a common assignee, to prevent pressure fluctuations occurring at or near the surface of cable 10 from propagating through elastic material 29 in mount 26 to hydrophone 30.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A marine seismic cable comprising:
   a cable core that is substantially cylindrical,
   a housing adapted for holding an acoustic energy transducer that is substantially curved and the sizes of said cable core and said housing are defined by the equation $$R_1R_3^2 + R_1R_2^2 - 2R_2^3 = 0$$

where,
$R_1$: radius of said cable core;
$R_2$: inside radius of said housing; and
$R_3$: outside radius of said housing, and
a body of elastic material positioned between said cable core and said housing.

2. A marine seismic cable as recited in claim 1, wherein said housing is cylindrical.

3. A marine seismic cable as recited in claim 2, wherein said body of elastic material is sized such that it occupies the entire space between said housing and said cable core.

4. A marine seismic cable as recited in claim 3, wherein said cable further comprises a cylindrical flotation body positioned around said cable core and sized such that the outside radius of said flotation body is substantially the same as the outside radius of said housing.

* * * * *